(12) United States Patent
Lee (10) Patent No.: US 10,864,794 B2
(45) Date of Patent: *Dec. 15, 2020

(54) HYBRID ELECTRIC VEHICLE AND HEATING CONTROL METHOD FOR THE SAME

(71) Applicants: HYUNDAI MOTOR COMPANY, Seoul (KR); KIA MOTORS CORPORATION, Seoul (KR)

(72) Inventor: Jea Mun Lee, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 169 days.

This patent is subject to a terminal disclaimer.

(21) Appl. No.: 16/183,394

(22) Filed: Nov. 7, 2018

(65) Prior Publication Data

US 2019/0135070 A1    May 9, 2019

(30) Foreign Application Priority Data

Nov. 7, 2017  (KR) .................... 10-2017-0147212

(51) Int. Cl.
*B60H 1/00*  (2006.01)
*B60W 20/15*  (2016.01)
(Continued)

(52) U.S. Cl.
CPC ......... *B60H 1/004* (2013.01); *B60H 1/00771* (2013.01); *B60K 6/442* (2013.01);
(Continued)

(58) Field of Classification Search
CPC .............. B60H 1/004; B60H 1/00771; B60H 1/00878; B60W 20/15; B60W 20/10;
(Continued)

(56) References Cited

U.S. PATENT DOCUMENTS

2015/0197235 A1* 7/2015 Yu .................. B60W 10/06
 701/22
2016/0339900 A1* 11/2016 Li ...................... B60K 6/46
(Continued)

FOREIGN PATENT DOCUMENTS

DE    102013009913 A1    12/2014
DE    102014226514 A1    6/2016
EP        1842758 A1    10/2007

OTHER PUBLICATIONS

Extended European Search Report of EP Application No. 18204777.9—8 pages (dated Jun. 12, 2019).

*Primary Examiner* — Geepy Pe
*Assistant Examiner* — Tiffany P Ohman
(74) *Attorney, Agent, or Firm* — McDonnell Boehnen Hulbert & Berghoff LLP (57) ABSTRACT

A passenger compartment of a hybrid electric vehicle is heated without operating an engine when passing through a specific zone using information about a route to a destination and a heating control method. The heating control method includes, when determined that a specific zone related to discharge of exhaust gas is present on a traveling route, determining a target coolant temperature, which is a coolant temperature to be reached when entering the specific zone, determining a coolant temperature increase distance necessary to reach the target coolant temperature, determining the time at which to start temperature increase control using the determined coolant temperature increase distance, and operating an engine from the time at which to start the temperature increase control until entering the specific zone.

19 Claims, 6 Drawing Sheets

(51) Int. Cl.
*B60W 50/00* (2006.01)
*B60K 6/442* (2007.10)
*F01P 7/00* (2006.01)
*B60W 20/10* (2016.01)

(52) U.S. Cl.
CPC ............ *B60W 20/10* (2013.01); *B60W 20/15* (2016.01); *B60W 50/0097* (2013.01); *F01P 7/00* (2013.01); *B60H 1/00878* (2013.01); *B60W 2554/00* (2020.02); *B60W 2555/20* (2020.02); *B60W 2556/50* (2020.02); *B60W 2710/0688* (2013.01)

(58) Field of Classification Search
CPC ......... B60W 50/0097; B60W 2556/50; B60W 2554/00; B60W 2555/20; B60W 2710/0688; B60K 6/442; F01P 7/00
USPC .......................................................... 701/36
See application file for complete search history.

(56) References Cited

U.S. PATENT DOCUMENTS

2017/0088003 A1* 3/2017 Yu ........................... B60L 50/15
2018/0186390 A1* 7/2018 Lavertu ................... B61L 3/006
2018/0257473 A1* 9/2018 Follen ...................... B60L 53/64
2018/0281774 A1* 10/2018 Fukuda ............. B60W 50/0097

\* cited by examiner

HYBRID ELECTRIC VEHICLE AND HEATING CONTROL METHOD FOR THE SAME

This application claims the benefit of Korean Patent Application No. 10-2017-0147212, filed on Nov. 7, 2017, which is hereby incorporated by reference as if fully set forth herein.

BACKGROUND

Field

The present disclosure relates to a hybrid electric vehicle and a heating control method for the same.

Discussion of the Related Art

In general, a hybrid electric vehicle (HEV) is a vehicle that uses two kinds of power sources, an internal combustion engine and an electric motor. In recent years, extensive research has been conducted into hybrid electric vehicles, since hybrid electric vehicles exhibit higher fuel economy, higher power performance, and lower discharge of exhaust gas than vehicles having only internal combustion engines.

A hybrid electric vehicle may operate in two traveling or driving modes based on connection of the powertrain thereof. One of the traveling modes is an electric vehicle (EV) mode, in which the hybrid electric vehicle is driven using only the electric motor, and another is a hybrid electric vehicle (HEV) mode, in which the hybrid electric vehicle is driven using both the electric motor and the engine. Based on traveling conditions, the hybrid electric vehicle switches between the modes.

SUMMARY

Accordingly, the present disclosure is directed to a hybrid electric vehicle and a heating control method.

An aspect of the present invention is to provide a method of more efficiently performing heating control and a hybrid electric vehicle for performing the method.

Another aspect of the present invention is to provide a method of efficiently heating an environmentally friendly vehicle while minimizing the operation of an engine in a specific zone and a vehicle for performing the method.

Additional advantages, aspects, and features of the invention will be set forth in part in the description which follows and in part will become apparent to those having ordinary skill in the art upon examination of the following or may be learned from practice of the invention. The advantages of the invention may be realized and attained by the structure particularly pointed out in the written description and claims hereof as well as the appended drawings.

To achieve these and other advantages, as embodied and broadly described herein, a heating control method for a hybrid electric vehicle includes, when determined that a specific zone related to discharge of exhaust gas is present along a traveling route, determining a target coolant temperature, which is a coolant temperature to be reached when entering the specific zone, determining a coolant temperature increase distance necessary to reach the target coolant temperature, determining the time at which to start temperature increase control using the determined coolant temperature increase distance, and operating an engine from the time at which to start the temperature increase control until entering the specific zone.

In another aspect of the present invention, a hybrid electric vehicle includes a first control unit for, when at least one specific zone related to discharge of exhaust gas is present on a traveling route, acquiring information about the traveling route including the at least one specific zone, and a second control unit for determining a target coolant temperature, which is a coolant temperature to be reached when entering the specific zone, using the information received from the first control unit, determining a coolant temperature increase distance necessary to reach the target coolant temperature, determining the time at which to start temperature increase control based on the determined coolant temperature increase distance, and performing control so as to operate an engine from the time at which to start the temperature increase control until entering the specific zone.

It is to be understood that both the foregoing general description and the following detailed description of embodiments of the present invention are exemplary and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF EMBODIMENTS

Reference will now be made in detail to the preferred embodiments of the present invention, examples of which are illustrated in the accompanying drawings. The following embodiments are given by way of example in order to enable those skilled in the art to fully understand the idea of the present invention. Therefore, the present invention is not limited by the following embodiments, and may be realized in other forms. In order to clearly describe the present invention, parts having no relation with the description of embodiments of the present invention may be omitted from the drawings. Wherever possible, the same reference numerals will be used throughout the specification to refer to the same or like parts.

The term "comprises" or "includes" used herein should be interpreted not to exclude other elements but to further include such other elements, since the corresponding elements may be inherent unless mentioned otherwise. In addition, parts denoted by the same reference numerals throughout the specification indicate the same elements.

Recently, there are increasing demands for environmental friendliness that lead to establishment of special zones in which it is required to reduce of exhaust gas. The special zones are being established in an explicit or implied manner based on regulations for environmental friendliness, air qualities, pedestrian's health, etc. In order to drive a vehicle in these zones, it is preferable for the vehicle to be driven in an EV mode, in which a combustion engine is not operated.

To heat the interior or passenger compartment of a hybrid electric vehicle, heat from the coolant of the combustion engine is generally used. When the operation of the engine is not appropriate, however, it is difficult to heat the interior or passenger compartment of the vehicle as the heat from the engine coolant would be unavailable for heating the passenger compartment. In order to use heat of the coolant of the engine, the engine is operated to some extent. Thus, when the engine is not operating, it would be difficult to heat the passenger compartment.

An electronic heater (e.g. a PTC heater) may be used for heating the passenger compartment. When the electric heater is used, however, electric power of a battery is greatly consumed. If the EV-mode operating and the electronic heater's operation are simultaneously performed, electric power of the battery is excessively consumed. As a result, the EV-mode traveling distance is drastically shortened, and the combustion engine may be operated again before leaving the specific zone in which the operation of the engine is not appropriate.

Prior to describing a heating control method according to an embodiment of the present invention, the concept of a zone in which the operation of an engine is restrained will be described with reference to FIG. 1.

Figure 1:
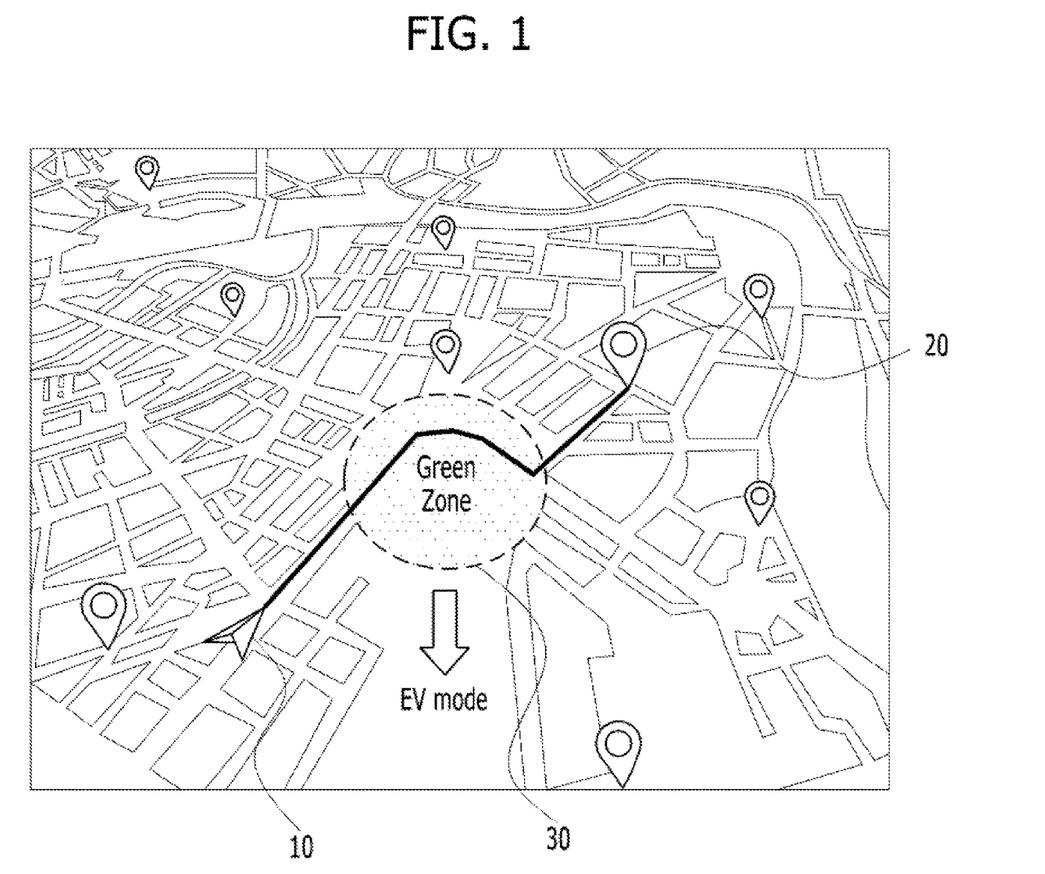
FIG. 1 is a view illustrating the concept of a specific zone to which embodiments of the present invention are applicable.

FIG. 1 is a view illustrating the concept of a specific zone to which embodiments of the present invention are applicable.

Referring to FIG. 1, it is assumed that, in embodiments of the present invention, in a specific zone 30, the amount of exhaust gas is required to be reduced to a predetermined level or the discharge of exhaust gas is prohibited. The specific zone may be located between a departure location 10 and a destination location 20 of a vehicle. The specific zone 30 may be a zone that is set in advance or a zone that is temporarily set depending on situations, such as, air qualities, special events attracting people. Here, the zone that is set in advance may be a zone set according to regulations or government policies (for example, an exhaust gas control zone in London, Seoul, etc.) or a zone in which the amount of exhaust gas is required to be reduced according to the regional characteristics (for example, a child protection zone, an indoor parking lot, a residential district, etc.).

In embodiments, the zone that is temporarily set may be a zone in which a determination as to whether the zone is currently set can be made through wireless information such as telematics, a pedestrian concentration zone determined through a vision information acquisition device (e.g. an ADAS system, etc.) provided in a vehicle, an indoor environment, or a zone indicated by recognizable signs. In embodiments, when the atmospheric characteristics or air qualities of a zone, based on the reference to atmospheric environment information, become worse, the zone may be temporarily set as a specific zone 30. When a zone is determined to be a pedestrian concentration zone based on big data utilizing location information of mobile phones, the zone may be set as a specific zone 30. When a zone is estimated to be a place in which a large amount of exhaust gas is generated based on the average speed of vehicles and the amount of traffic collected through a telematics service, the zone may be set as a specific zone 30.

The specific zone 30 may be set as an arbitrary administrative district unit, as a zone that interconnects a plurality of coordinates that become border points, as the entirety or a portion of a specific facility, or as a zone within a predetermined radius from a specific facility or coordinates.

Of course, the above examples of setting of the specific zone are merely illustrative. The embodiments of the present invention are not limited thereto. In other embodiments, there would be different rules, regulations, standards or formulas for setting or designating specific zones, the area of specific zones, timing for setting the specific zones or releasing from the designation of the specific zone. In addition, although it is assumed that the specific zone 30 is located between the departure location 10 and the destination location 20, it is not required for a user to necessarily set the destination on a navigation function of an audio/video/navigation (AVN) system. For example, the destination location may be set by a vehicle depending on a driver's driving pattern or predetermined traveling conditions (time, zone, etc.). For determining driving modes, however, the presence or absence of such a specific zone on a route and the size of the specific zone 30 may be determined by a vehicle before entering the specific zone 30 during the driving of the vehicle or before leaving the departure location.

In the following description, a zone in which the amount of exhaust gas is required to be reduced or in which the discharge of exhaust gas is prohibited will be referred to as a "green zone" for the sake of convenience.

Next, the structure of a hybrid electric vehicle to which embodiments of the present invention are applicable will be described with reference to FIG. 2.

Figure 2:
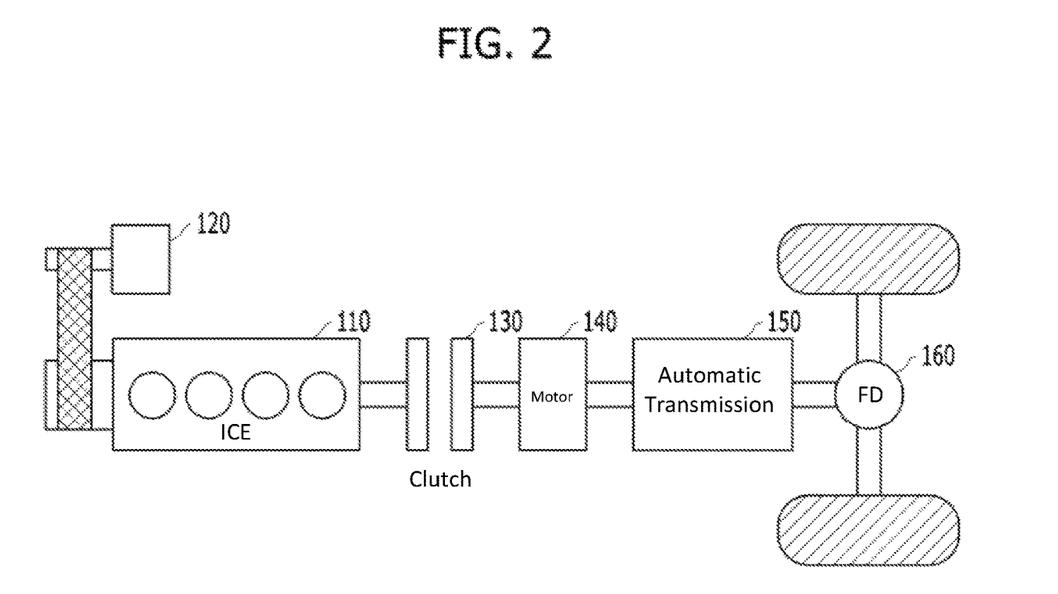
FIG. 2 is a view showing an example of a powertrain structure of a hybrid electric vehicle to which embodiments of the present invention are applicable.

FIG. 2 is a view showing an example of a powertrain structure of a hybrid electric vehicle to which embodiments of the present invention are applicable.

Referring to FIG. 2, there is shown a powertrain of a hybrid electric vehicle adopting a parallel-type hybrid system, having an electric motor (or a drive motor) 140 and an engine clutch (EC) 130 mounted between an internal combustion engine (ICE) 110 and a transmission 150.

In such a vehicle, when a driver steps on an accelerator pedal after starting, the motor 140 is first driven using electric power from a battery in the state in which the engine clutch 130 is open, and then power from the motor 140 is transmitted to the wheels via the transmission 150 and a final drive (FD) 160 in order to rotate the wheels (i.e. an EV mode). When higher driving force is needed as the vehicle is gradually accelerated, an auxiliary motor (or a starter/generator motor) 120 may be operated to start the engine 110.

When the rotational speeds of the engine 110 and the motor 140 become equal, the engine clutch 130 is locked, with the result that both the engine 110 and the motor 140 drive the vehicle, or the engine 110 alone drives the vehicles (i.e. transition from the EV mode to an HEV mode). When a predetermined engine off condition is satisfied, for example, when the vehicle is decelerated, the engine clutch 130 is opened, and the engine 110 is stopped (i.e. transition from the HEV mode to the EV mode). In addition, when the hybrid electric vehicle is braked, driving force or rotation of the wheels may be converted into electrical energy, which may be used to charge the battery, which is referred to as recovery of braking energy or regenerative braking.

The starter/generator motor 120 acts as a start motor when starting the engine and as a generator after starting the engine, at the time of engine stop, or when engine rotation energy is collected. Therefore, the starter/generator motor 120 may be referred to as a "hybrid start generator (HSG)". Depending on the circumstances, the starter/generator motor 120 may also be referred to as an "auxiliary motor".

Figure 3:
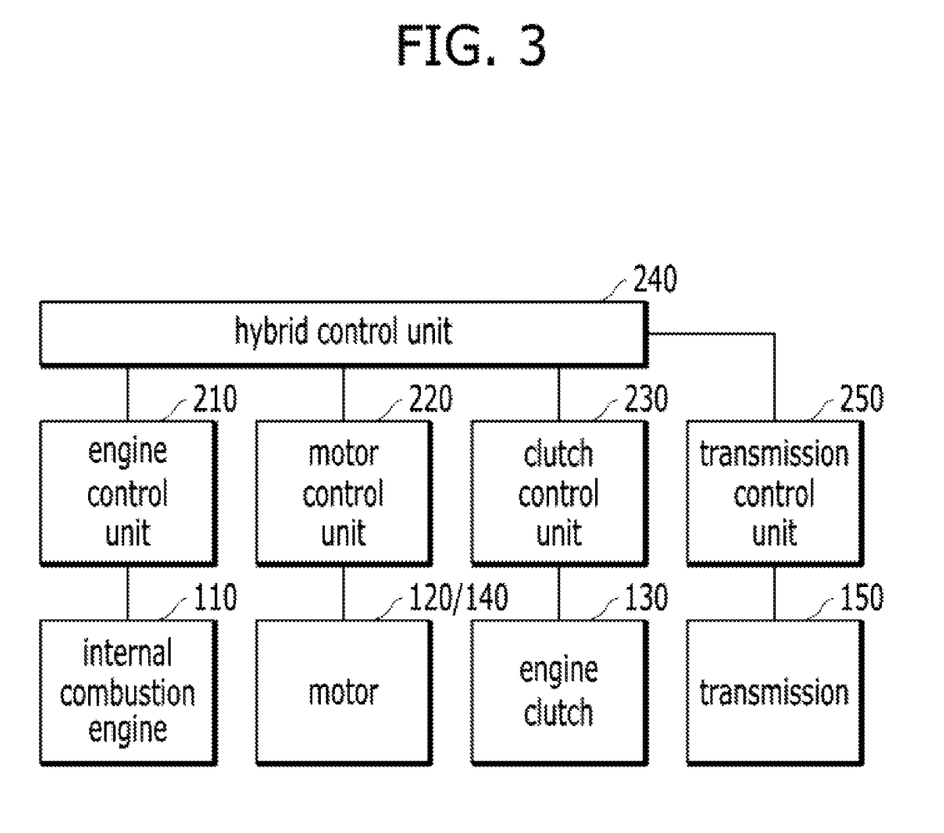
FIG. 3 is a block diagram showing an example of the control system of the hybrid electric vehicle to which embodiments of the present invention are applicable.

The interrelation between control units or controllers of the vehicle using the powertrain is shown in FIG. 3.

FIG. 3 is a block diagram showing an example of the control system of the hybrid electric vehicle to which embodiments of the present invention are applicable.

Referring to FIG. 3, in the hybrid electric vehicle to which embodiments of the present invention is applicable, the internal combustion engine 110 may be controlled by an engine control unit 210, the torque of the starter/generator motor 120 and the electric motor 140 may be controlled by a motor control unit (MCU) 220, and the engine clutch 130 may be controlled by a clutch control unit 230. The engine control unit 210 may also be referred to as an engine management system (EMS). In addition, the transmission 150 is controlled by a transmission control unit 250. Depending on the circumstances, the starter/generator motor 120 and the electric motor 140 may be controlled by different motor control units.

Each control unit may be connected to a hybrid control unit 240, which is an upper controller, for controlling an overall mode-switching process in order to provide information necessary for engine clutch control at the time of switching traveling or driving modes or shifting gears under the control of the hybrid control unit 240 and/or information necessary for engine stop control to the hybrid control unit 240 or to perform an operation based on a control signal from the hybrid control unit 240.

More specifically, the hybrid control unit 240 determines whether to perform mode switching based on the traveling or operation state of the vehicle. For example, the hybrid control unit 240 may determine the open time of the engine clutch 130, and, when the engine clutch 130 is opened, may perform hydraulic control (for a wet-type engine clutch) or torque capacity control (for a dry-type engine clutch). In addition, the hybrid control unit 240 may determine a state (lockup, slip, or open) of the engine clutch 130, and may control the time at which to interrupt the injection of fuel into the engine 110. In addition, the hybrid control unit 240 may transmit a torque command for controlling the torque of the starter/generator motor 120 in order to perform engine stop control to the motor control unit 220, whereby it is possible to control the collection of engine rotation energy. Furthermore, the hybrid control unit 240 may control a lower control unit for determining mode-switching conditions and performing mode switching at the time of controlling adaptive mode switching according to embodiments of the present invention, a description of which will follow.

Of course, it will be obvious to those skilled in the art that the interrelation between the control units and the functions/classification of the control units are illustrative only, and not restricted by the names thereof. For example, the hybrid control unit 240 may be configured such that one of the other control units excluding the hybrid control unit 240 provides the corresponding function or such that two or more thereof provide the corresponding function in a distributed fashion. Although a transmission-mounted-electric-device (TMED)-type parallel hybrid electric vehicle has been described with reference to FIGS. 2 and 3, this type of vehicle is illustrative only. Consequently, the embodiments of the present invention are not limited as to the type of the hybrid electric vehicle. The embodiments of the present invention are applicable to any type of hybrid electric vehicle, as long as heat generated as the result of operating the engine is utilized to perform heating the passenger compartment.

Hereinafter, a more efficient heating control method according to an embodiment of the present invention will be described based on the structure of the vehicle described above.

In embodiments, upon determining that a green zone is present on a traveling route using travelling route information, for example, the information from a navigator, the control system determines an amount of heat necessary for heating the passenger compartment while driving in the green zone before entering the green zone in order to perform heating without operating the engine in the green zone.

To this end, in an aspect of this embodiment, target heating performance may be determined in advance, and then the time at which to perform engine coolant temperature increase control (i.e. to start temperature increase control) based on the target heating performance may be determined. Here, the target heating performance means the total energy necessary for heating while driving in the green zone, and may be expressed as a target coolant temperature to be reached immediately before entering the green zone. In addition, the time for start coolant temperature increase control may depend on the current remaining distance until entering the green zone and the traveling distance necessary or required to reach the target coolant temperature (hereinafter, referred to as a "coolant temperature increase distance" for the sake of convenience).

In addition, in an aspect of this embodiment, the travelling route information may be navigation information. Here, the navigation information may include at least one of the presence or absence of a green zone, the road types, the slope of road, an average vehicle speed, or a degree of congestion (real-time traffic information). In general, the navigation information may be acquired through a navigation system, i.e. an audio/video/navigation (AVN) system. However, the present invention is not limited thereto. For example, the navigation information may be acquired from a telematics center through a telematics unit, or may be acquired through data center/server/cloud access using a wireless communication module. Information about the vehicle speed may be acquired using various sensors in the vehicle.

Here, the determination of the target heating performance and the time at which to perform temperature increase control will be described in detail with reference to FIGS. 4 and 5.

Figure 4:
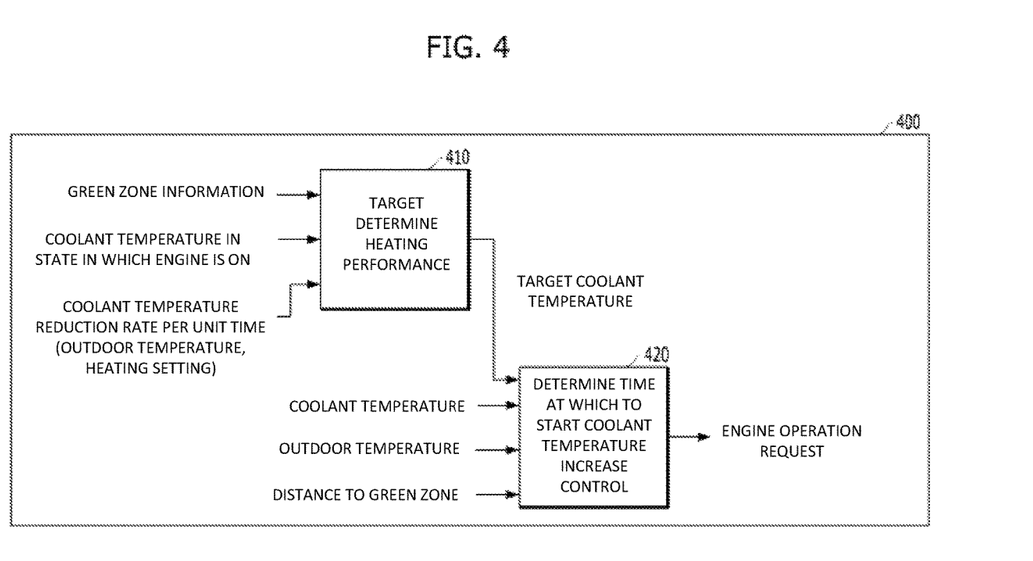
FIG. 4 is a view illustrating an example of the structure of control logic for an engine operation request according to an embodiment of the present invention.
Figure 5:
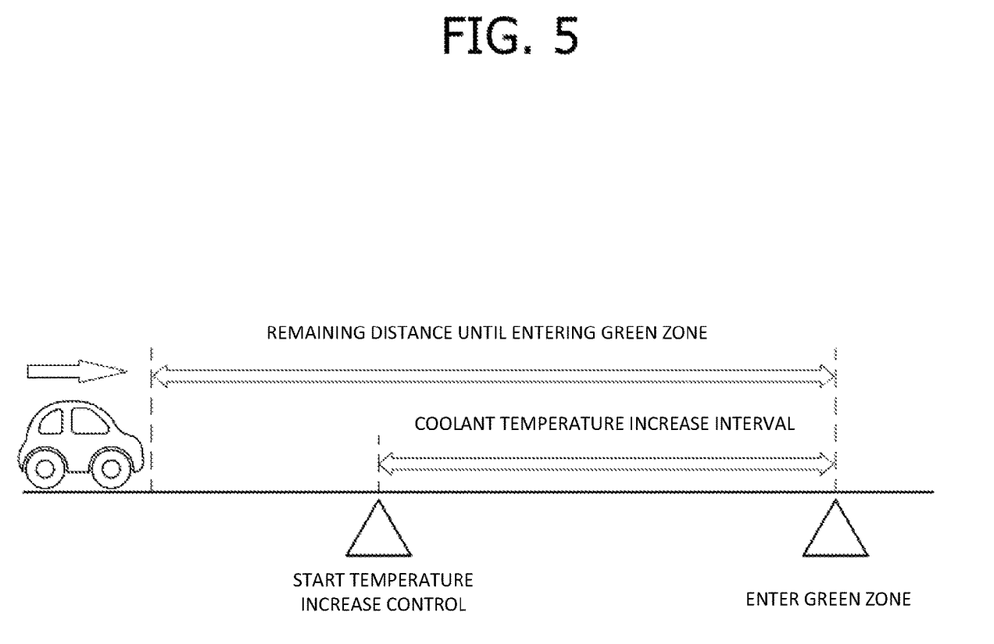
FIG. 5 is a view illustrating a method of determining the time at which to perform coolant temperature increase control according to an embodiment of the present invention.

FIG. 4 is a view illustrating an example of the structure of control logic for an engine operation request according to an embodiment of the present invention, and FIG. 5 is a view illustrating a method of determining the time at which to perform coolant temperature increase control according to an embodiment of the present invention.

Referring to FIG. 4, control logic 400 according to this embodiment may include a target heating performance determination unit 410 and a coolant temperature increase control timing determination unit 420.

First, the target heating performance determination unit 410 may determine a target coolant temperature using at least one of information about a green zone, a coolant temperature in the state in which the engine is on, or a coolant temperature reduction rate per unit time. In embodiments, the information about the green zone may include at least one of a traveling distance in the green zone, a vehicle speed limit, the amount of traffic, or signal information, which may be acquired through the navigation information. In embodiments, the engine coolant temperature in the state in which the engine is on may mean the minimum coolant temperature to be maintained for heating. In embodiments, the coolant temperature in the state in which the engine is on may be a predetermined value, or may be a value determined based on the season or the outdoor temperature. In embodiments, the coolant temperature reduction rate per unit time indicates the extent to which the coolant temperature is reduced over time at which the engine is turned off. The outdoor temperature is the main factor for determining the coolant temperature reduction rate per unit time, and the coolant temperature reduction rate per unit time may be determined in consideration of a heating setting state (for example, a set temperature and an indoor temperature). For example, when the outdoor temperature is low and the difference between the target heating temperature and the indoor temperature is great, the coolant temperature is rapidly lowered. In the opposite case, the coolant temperature is slowly lowered.

Details of a method of determining the target coolant temperature based on the above information is as follows.

The target coolant temperature $T_{\_Target}$ is determined based on the coolant temperature reduction rate per unit time $\Delta T$, the green zone traveling time t, and the coolant temperature $T_{\_On}$ at the time when the engine is on, as expressed in Equation 1 below.

$$T_{\_Target} = (\Delta T * t) + T_{\_n} \qquad \text{[Equation 1]}$$

In embodiments, the target coolant temperature is the sum of the coolant temperature when the engine is on and the expected decrease in the coolant temperature due to heating without operating the engine in the green zone. When $T_{\_On}$ is predetermined, the target coolant temperature is substantially determined by the coolant temperature reduction rate per unit time $\Delta T$ and the green zone traveling time t. The coolant temperature reduction rate per unit time is the same as what has been described previously. The green zone traveling time may be determined by the traveling distance in the green zone and the traveling vehicle speed. In embodiments, the traveling distance in the green zone is a value dependent on a green zone setting state, and the traveling vehicle speed may be determined through the amount of traffic, signal information, etc. based on the vehicle speed limit in the green zone.

The target coolant temperature determined by the target heating performance determination unit 410 is transmitted to the coolant temperature increase control timing determination unit 420. When determining the time at which to perform temperature increase control, the coolant temperature increase control timing determination unit 420 avoids unnecessary operation of the engine while securing the target coolant temperature before entering the green zone.

In embodiments, for accurately estimating the coolant temperature increase distance that is a driving distance necessary for the coolant temperature to reach the target coolant temperature, the coolant temperature increase distance may be obtained as expressed in Equation 2 below.

$$D_{\_Up} = T_{\_Up} * V_{\_Mean} * K \qquad \text{[Equation 2]}$$

According to Equation 2, the coolant temperature increase distance $D_{\_Up}$ may be expressed by the product of the required temperature increase $T_{\_Up}$ (=the target coolant temperature−the current coolant temperature), the average vehicle speed $V_{\_Mean}$ until reaching the green zone, and the time K required for increasing a unit temperature (for example, 1° C.)

The greater the required temperature increase is, the longer the coolant temperature increase distance is needed. On the other hand, the smaller the required temperature increase is, the shorter the coolant temperature increase distance is needed. In addition, the average vehicle speed to the green zone $V_{\_Mean}$ may be determined in consideration of the amount of traffic, signal information, etc. based on the vehicle speed limit until the green zone. Furthermore, the time K required for increasing a unit temperature depends on the coolant temperature increase rate per unit time at which the engine is operated for temperature increase control, and may be determined basically based on the characteristics of the engine and the cooling system. In embodiments, the outdoor temperature may be considered as a factor for determining the time required for increasing a unit temperature.

When the coolant temperature increase distance is determined, as described above, the coolant temperature increase control timing determination unit 420 may determine to start temperature increase control at the time at which the remaining distance until entering the green zone becomes equal to or less than the coolant temperature increase distance, as shown in FIG. 5, in order to prevent unnecessary operation of the engine.

In an aspect of this embodiment, when realizing the control logic 400, the target heating performance determination unit 410 and the coolant temperature increase control timing determination unit 420 may be realized by the same control unit or by different control units. For example, the functions of the target heating performance determination unit 410 and the coolant temperature increase control timing determination unit 420 may be realized so as to be performed by the hybrid control unit or controller. In embodiments, the hybrid control unit may acquire information about the green zone from the AVN system, and may acquire the coolant temperature in the state in which the engine is on from the engine control unit, or may store the coolant temperature in the state in which the engine is on in an internal memory thereof in advance. In addition, information about the outdoor temperature may be acquired from an outdoor temperature sensor, and heating settings may be acquired from an air conditioner control unit (FATC, etc.). Furthermore, information about the current coolant temperature may be acquired from the engine control unit, and the engine operation request may be performed in a manner in which a command is transmitted to the engine control unit. In another aspect of this embodiment, the above-described functions of the control logic may be performed by the engine control unit, or a separate control unit may be provided in order to perform this logic.

The control logic according to the embodiment described above may be summarized as shown in FIG. 6.

Figure 6:
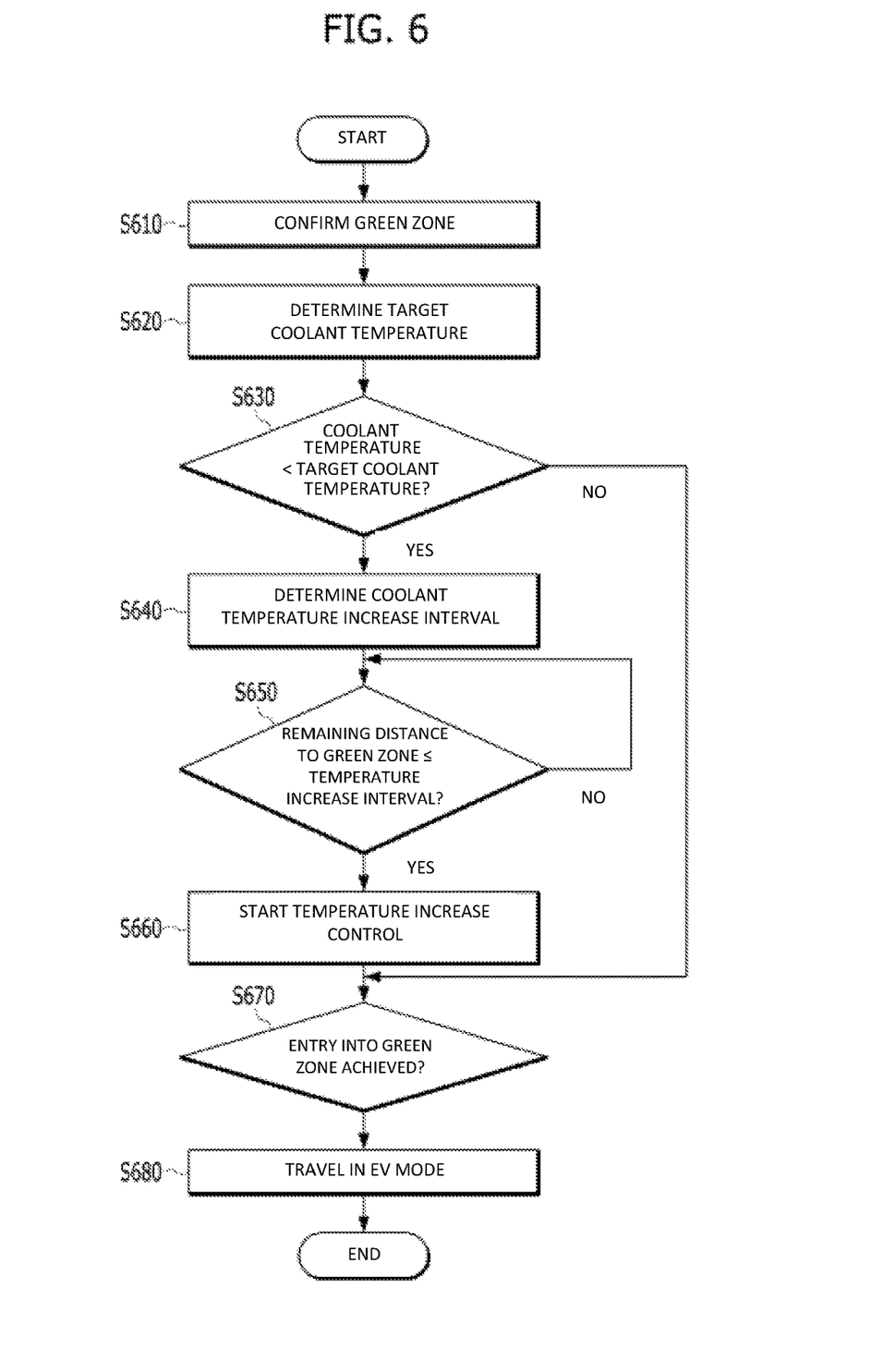
FIG. 6 is a flowchart showing an example of a heating control process according to an embodiment of the present invention.

FIG. 6 is a flowchart showing an example of a heating control process of a hybrid electric vehicle according to an embodiment of the present invention.

Referring to FIG. 6, a green zone on a traveling route may be confirmed (S610). In embodiment, "confirmation" may mean a determination as to whether at least one green zone is present on the route and the acquisition of information about the green zone when the green zone is present on the route.

When the green zone in the traveling route is confirmed, a target coolant temperature may be determined (S620). A method of obtaining the target coolant temperature may be derived from Equation 1, described with reference to FIG. 4, and therefore a duplicate description thereof will be omitted for simplicity of the specification.

When the target coolant temperature is determined, the target coolant temperature may be compared with the current coolant temperature (S630). When the current coolant temperature is lower than the target coolant temperature as the result of comparison (i.e. when it is necessary to increase the coolant temperature), a coolant temperature increase distance may be determined (S640). The method of determining the coolant temperature increase distance may also be derived from Equation 2, described with reference to FIG. 4, and therefore a duplicate description thereof will be omitted.

When the coolant temperature increase distance is determined, the coolant temperature increase distance may be compared with the remaining distance to the green zone (S650). When the remaining distance to the green zone becomes equal to or less than the coolant temperature increase distance, temperature increase control may be performed (i.e. the engine may be operated) (S660).

Subsequently, the temperature increase control may be performed until entering the green zone. Upon determining that entry into the green zone (S670), the engine may be turned off, and EV mode traveling may be performed (S680).

In embodiments, if a plurality of green zones is present along the route, the above control process may be individually performed for each green zone.

Embodiments of the present invention may be implemented as code that can be written on a computer-readable medium and thus read by a computer. The computer-readable medium may be any type of recording device in which data is stored in a computer-readable manner. The computer-readable medium may include, for example, a hard disk drive (HDD), a solid-state disk (SSD), a silicon disk drive (SDD), a read-only memory (ROM), a random access memory (RAM), a compact disc read-only memory (CD-ROM), a magnetic tape, a floppy disk, and an optical data storage device.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

As is apparent from the above description, a hybrid electric vehicle according to at least one embodiment of the present invention can more efficiently perform heating control.

Particularly, when a specific zone is present on a traveling route, it is possible to secure or maintain coolant temperature necessary for heating in the specific zone before entering the specific zone, thereby heating the passenger compartment without operating the engine and using energy from the batteries.

It will be appreciated by those skilled in the art that effects achievable through the present invention are not limited to what have been particularly described hereinabove and other effects of the present invention will be more clearly understood from the above detailed description.

The above detailed description is not to be construed as limiting the present invention in any aspect, and is to be considered by way of example. The scope of the present invention should be determined by reasonable interpretation of the accompanying claims, and all equivalent modifications made without departing from the present invention should be included in the following claims.

What is claimed is:

1. A heating control method for a hybrid electric vehicle, the method comprising:
   determining a specific zone related to discharge of exhaust gas is present on a traveling route,
   when determined that the specific zone related to the discharge of exhaust gas is present on the traveling route, determining a target coolant temperature to be reached when entering the specific zone;
   determining a coolant temperature increase distance that is indicative of a vehicle's traveling distance to increase the coolant temperature to the target coolant temperature;
   determining a time at which to start temperature increase control using the determined coolant temperature increase distance; and
   operating an engine from the time at which to start the temperature increase control until entering the specific zone.

2. The heating control method according to claim 1, wherein the step of determining the target coolant temperature comprises adding an expected coolant temperature decrease due to heating without operating the engine while passing through the specific zone to a coolant temperature in a state in which the engine is on.

3. The heating control method according to claim 2, wherein the step of determining the target coolant temperature comprises:
   determining a coolant temperature reduction rate per unit time;
   determining an estimated traveling time in the specific zone; and
   determining the expected coolant temperature decrease using the coolant temperature reduction rate per unit time and the estimated traveling time.

4. The heating control method according to claim 3, wherein
   the coolant temperature reduction rate per unit time is determined using at least one of an outdoor temperature, a heating setting temperature, or an indoor temperature, and
   the estimated traveling time is determined using at least one of a traveling distance in the specific zone, a vehicle speed limit, an amount of traffic, or signal information.

5. The heating control method according to claim 1, wherein the step of determining the coolant temperature increase distance is performed using a required temperature increase, an average vehicle speed in the specific zone, and a temperature increase time per unit temperature.

6. The heating control method according to claim 5, wherein the required temperature increase corresponds to a difference between the target coolant temperature and a current coolant temperature.

7. The heating control method according to claim 1, wherein the step of determining the time at which to start the temperature increase control comprises determining the time at which to start the temperature increase control when a remaining distance to the specific zone becomes equal to or less than the coolant temperature increase distance.

8. The heating control method according to claim 1, further comprising switching to an electric vehicle (EV) mode when entering the specific zone.

9. The heating control method according to claim 1, wherein the specific zone comprises a zone in which a reduction in the discharge of exhaust gas is required.

10. A computer-readable recording medium containing a program for performing the heating control method for the hybrid electric vehicle according to claim 1.

11. A hybrid electric vehicle comprising:
- a navigation system for, in a case in which at least one specific zone related to discharge of exhaust gas is present on a traveling route, acquiring information about the traveling route comprising the at least one specific zone; and
- a hybrid control unit for determining a target coolant temperature, which is a coolant temperature to be reached when entering the specific zone, using the information received from the navigation system, determining a coolant temperature increase distance necessary to reach the target coolant temperature, determining a time at which to start temperature increase control based on the determined coolant temperature increase distance, and performing control so as to operate an engine from the time at which to start the temperature increase control until entering the specific zone.

12. The hybrid electric vehicle according to claim 11, wherein the hybrid control unit adds an expected coolant temperature decrease due to heating without operating the engine while passing through the specific zone to a coolant temperature in a state in which the engine is on in order to determine the target coolant temperature.

13. The hybrid electric vehicle according to claim 12, wherein the hybrid control unit determines the expected coolant temperature decrease using a coolant temperature reduction rate per unit time and an estimated traveling time in the specific zone.

14. The hybrid electric vehicle according to claim 13, wherein
- the coolant temperature reduction rate per unit time is determined using at least one of an outdoor temperature, a heating setting temperature, or an indoor temperature, and
- the estimated traveling time is determined using at least one of a traveling distance in the specific zone, a vehicle speed limit, an amount of traffic, or signal information.

15. The hybrid electric vehicle according to claim 11, wherein the hybrid control unit determines the coolant temperature increase distance using a required temperature increase, an average vehicle speed in the specific zone, and a temperature increase time per unit temperature.

16. The hybrid electric vehicle according to claim 15, wherein the required temperature increase corresponds to a difference between the target coolant temperature and a current coolant temperature.

17. The hybrid electric vehicle according to claim 11, wherein the hybrid control unit determines the time at which to start the temperature increase control when a remaining distance to the specific zone becomes equal to or less than the coolant temperature increase distance.

18. The hybrid electric vehicle according to claim 11, wherein the hybrid control unit performs control such that switching to an electric vehicle (EV) mode is performed when entering the specific zone.

19. The hybrid electric vehicle according to claim 11, wherein the specific zone comprises a zone in which a reduction in the discharge of the exhaust gas is required.

\* \* \* \* \*